United States Patent [19]

Traynard et al.

[11] 4,244,170
[45] Jan. 13, 1981

[54] SPINNING DEVICE COMPRISING A RING ROTATABLY SUPPORTED ON A FLUID BEARING

[75] Inventors: Olivier Traynard, Mulhouse; Jean-Pierre Bruggeman, Villeneuve d'Ascq, both of France

[73] Assignees: Societe Alsacienne de Constructions Mecaniques de Mulhouse; Institut Textile de France; Agence Nationale de Valorisation de la Recherche (ANVAR), all of France

[21] Appl. No.: 22,185

[22] Filed: Mar. 20, 1979

[30] Foreign Application Priority Data

Mar. 24, 1978 [FR] France ................................ 78 08635

[51] Int. Cl.³ ............................................ D01H 7/56
[52] U.S. Cl. ...................................................... 57/124
[58] Field of Search ................. 57/119, 120, 122, 124

[56] References Cited

U.S. PATENT DOCUMENTS

| 3,324,643 | 6/1967 | Kluttz | 57/124 |
| 3,345,814 | 10/1967 | Gruet | 57/124 |
| 3,481,131 | 12/1969 | Chilpan | 57/124 |
| 3,494,120 | 2/1970 | Chilpan et al. | 57/124 X |
| 3,543,503 | 12/1970 | Watabe et al. | 57/124 X |
| 3,611,697 | 10/1969 | Greb | 57/124 |

Primary Examiner—Donald Watkins
Attorney, Agent, or Firm—Holman & Stern

[57] ABSTRACT

Each spinning ring of a ring-frame spinning device is carried by a fluid bearing supplied with compressed air for centering and lifting the ring. The flow of compressed air is selectively interrupted or at least reduced by means of an automatic or hand-operated valve or cock in order to reduce or suppress the ring-lifting action. A braking action is thus produced on the ring as it is brought into frictional contact with a top horizontal radial surface of a ring carrier or stator. The braking action can be applied selectively to one or a number or all the rings of any ring spinning frame employed in the textile industry.

1 Claim, 2 Drawing Figures

SPINNING DEVICE COMPRISING A RING ROTATABLY SUPPORTED ON A FLUID BEARING

BRIEF SUMMARY OF THE INVENTION

This invention relates to a revolving spinning ring mounted to rotate freely within a ring carrier which forms a fluid bearing, said bearing being supplied with fluid under pressure for centering and lifting the revolving ring.

Fluid-bearing spinning rings of this type are already known and make it possible to attain much higher spindle speeds than those permitted by conventional spinning frames by reason of the low friction forces encountered in fluid bearings.

However, the advantages arising from low values of friction become disadvantages when it is necessary to stop the spinning ring, for example in order to piece the yarn between the spinning bobbin and the fiber-opening roller of a continuous-spinning frame, the more so as the speeds of rotation may exceed 15,000 or 20,000 rpm.

This invention makes it possible to overcome these disadvantages and accordingly relates to a method as well as a device for braking and stopping a revolving spinning ring of the type mentioned above.

The method of braking in accordance with the invention consists in interrupting or at least reducing the rate of flow of fluid under pressure supplied to the fluid bearing and consequently stopping at least the lifting action produced on the revolving ring, thereby causing the rotating elements of the bearing which are rigidly fixed to the ring to come into frictional contact with the oppositely-facing stationary elements which form part of said bearing, thus producing a braking effect on the ring.

The invention is also directed to a ring-frame spinning device in which each ring is rotatably supported on a fluid bearing and which comprises: a ring carrier or stator having at least one internal surface of revolution which has a radial component and an axial component; compressed-air discharge ducts having their openings on said internal surfaces; a ring freely mounted within said stator and having external surfaces of revolution which cooperate with said internal surfaces in order to form with said surfaces a compressed-air leakage gap for centering and lifting the ring; and a yarn-guide ring traveler which is capable of sliding freely on the ring. The device essentially comprises means for interrupting or selectively reducing the flow of compressed air admitted into the discharge ducts aforesaid. When they are put into operation, the aforesaid interrupting means serve either to reduce or suppress at least the lifting of the ring in order to produce a braking effect on said ring by bringing it into frictional contact with the cooperating surfaces aforesaid.

In accordance with a usual form of construction of fluid bearings, the ducts for the discharge of compressed air into the leakage gap are all supplied from a manifold which surrounds the stator. In accordance with the invention, the interrupting means such as a hand-operated or automatic valve or cock are interposed in the duct which connects said manifold to the general duct for the supply of air to the machine so that each spinning ring on a spinning frame can be braked and stopped individually.

In accordance with another embodiment which can be adapted separately or in conjunction with the previous form of construction, the interrupting means can be mounted in the general duct which supplies a plurality of rings on a spinning frame so that a plurality of rings (or all the rings) of any one spinning frame can be braked and stopped in a single operation.

In some applications, it can be an advantage to effect a separate supply of fluid to the discharge ducts which serve to center the ring and to the discharge ducts which produce a lifting action. In this case, the means according to the invention for producing braking action by interrupting the air flow may be employed to interrupt only the ring-lifting air flow.

BRIEF DESCRIPTION OF THE DRAWINGS

A better understanding of the invention will be gained from the following detailed description and from the accompanying drawings in which one embodiment of the invention is given by way of example and not in any limiting sense, and in which.

Figure 1:
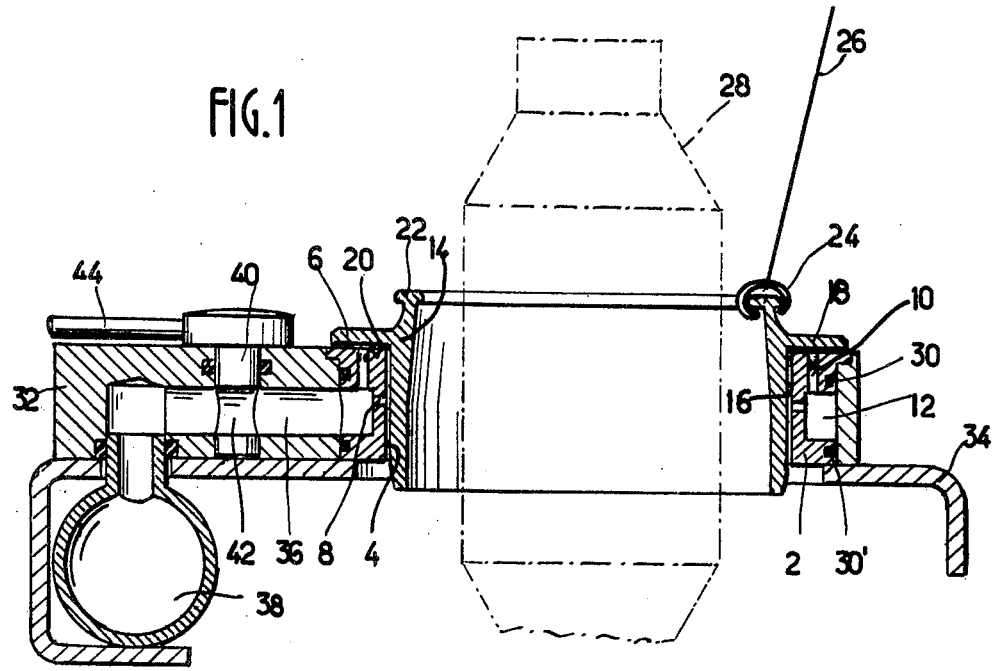
FIG. 1 is a vertical sectional view of one embodiment of the device in accordance with the invention.
Figure 2:
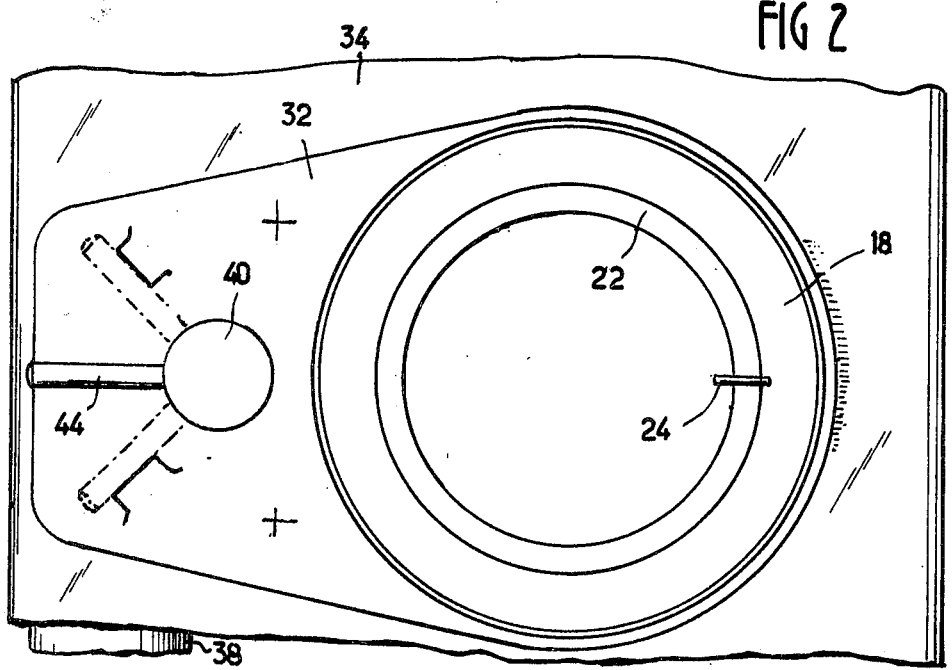
FIG. 2 is a plan view of the same device.

The ring-frame spinning device in which each ring is rotatably supported on a fluid bearing as shown in FIGS. 1 and 2 comprises a ring carrier or stator 2 having an internal cylindrical surface 4 and a horizontal top radial surface 6. Compressed-air discharge ducts 8 and 10 drilled in a circle around the entire periphery of the stator 2 have their openings respectively on the cylindrical surface 4 and on the radial surface 6. These discharge ducts are supplied from a manifold constituted by a channel 12 which is cut in the stator 2.

In the embodiment of FIGS. 1 and 2, the revolving ring 14 has a substantially T-shaped cross-section and a cylindrical external surface 16 which forms between said surface and the opposite surface 4 of the stator an annular leakage gap for centering the ring. The underface of the flange 18 of the ring constitutes a radial surface 20 opposite to the corresponding radial surface 6 of the stator. Discharge of compressed air through the ducts 10 is intended to form an air film between these two surfaces and consequently to lift the ring.

In accordance with standard practice, the ring has a circular rail 22 on which a ring traveler 24 is slidably mounted. Thus the yarn 26 passes through the traveler as it is wound onto the bobbin 28 in order to form this latter.

The stator is clamped in an air-tight manner within a frame unit 32 by means of packing-rings 30, 30', said frame unit being fixed on the support plate which carries all the rings of the spinning frame. By means of a duct 36 pierced in the frame unit 32, a general compressed-air supply duct 38 carried by the support plate 34 communicates with the manifold 12.

It is important to note that a revolving ring of this type is not driven in rotation by external driving means but only by the energy delivered by the traveler. In order to stop the ring, it is therefore not possible to utilize the driving means.

In accordance with the invention, an obturator 40 is interposed at a suitable point in the compressed air supply and especially in the duct 36. By way of example, said obturator can consist of a rotatable cylindrical plug through which a bore 42 has been drilled, said bore being located aligned with the air duct 36. The obturator 40 is fitted in the frame unit 32; opening or closure of the obturator can be effected manually by means of an operating lever 44. Alternatively, it would clearly be possible to adopt an obturator of the sliding type.

When the revolving ring is in operation, said ring is centered and lifted by the air films which are discharged respectively between the opposite surfaces 4–16 and 6–20. In other words, the bottom surface 20 of the flange 18 is slightly lifted above the radial surface 6 of the stator 2 and "floats" without friction above this latter.

If it is necessary to brake and stop the rotational motion of the ring, for example in order to perform a yarn-piecing operation, the compressed-air supply to the fluid bearing is interrupted by closing the obturator 40, with the result that the ring moves downwards with respect to the stator and that the bottom surface 20 of the flange 18 comes into frictional contact with the radial surface 6 of the stator, the ring being thus slowed-down until it comes to a standstill. By virtue of a judicious constructional design and choice of materials, the ring can therefore be stopped reliably and progressively by cutting-off the compressed air supply.

In the case shown in the drawings in which the cooperating axial surfaces 4–16 and radial surfaces 6–20 are distinct surfaces each having a separate supply of compressed air through separate discharge ducts, it would be possible in an alternative design to connect the sustentation or air-lift ducts 10 to a manifold which is separate from the manifold 12. The obturator device 40 would then be interposed solely in the supply duct of this second manifold. In order to produce a braking action on the ring, it would therefore be necessary only to suppress the sustentation effect of the fluid bearing while retaining the centering effect by virtue of the air discharge ducts 8 which would continue to be supplied.

In FIGS. 1 and 2, there has only been shown one individual obturator device 40 for braking each ring but it is readily apparent that an obturator device of this type could be interposed in a portion of duct which supplies a plurality of rings (or all the rings of one spinning frame) in order to produce simultaneous braking action on a plurality of rings.

It is also readily apparent that the invention is equally applicable to a fluid-bearing spinning device in which the cooperating surfaces having an axial component (for centering) and a radial component (for sustentation) are adapted to coincide, for example bearings having either conical or frusto-conical profiles.

Finally, in the device described in the foregoing with reference to the accompanying drawings, the rotating active surfaces of the bearing form an integral part of the ring itself since this is the most simple design. It will readily be understood, however, that the invention also extends to the case in which these surfaces form part of a component which is either added to or fixed on the ring itself. Lastly, the surfaces 6–20 which come into frictional contact can advantageously be provided with linings for promoting cooperation of said surfaces with a view to ensuring enhanced braking action.

As will be readily understood, the invention is not limited in any sense to the embodiment hereinabove described with reference to the drawings. Depending on the applications considered, many alternative arrangements within the capacity of those versed in the art may accordingly be contemplated without thereby departing from the scope or the spirit of the invention.

What is claimed is:

1. In a ring-frame spinning device in which each ring is rotatably supported on a fluid bearing and which comprises, a ring carrier or stator having an internal surface of revolution comprising a first axial surface and a second radial surface, a first set and a second set of compressed-air discharge ducts having their openings respectively in said first and second surfaces, means to supply a flow of compressed air to said first and second set of ducts, a ring freely mounted within said stator and having external axial and radial surfaces of revolution adapted to cooperate with said internal surfaces in order to form with said surfaces a compressed-air leakage gap for centering, by means of the first set of ducts, and for lifting, by means of the second set of ducts, the ring, and a yarn-guide ring traveller which is capable of sliding freely on the ring, the improvement comprising means for controlling the flow of compressed air admitted only to said second set of discharge ducts, which serves to lift the ring, said control means being adapted to reduce the lifting of the ring when it is desired to stop the ring in order to produce a braking effect on said ring by bringing its said radial surface into frictional contact with said cooperating second radial surface of the stator, while the flow of compressed air to said first set of discharge ducts is maintained in order to keep the ring centered during braking.

* * * * *